United States Patent
Lee et al.

(10) Patent No.: US 9,204,271 B2
(45) Date of Patent: Dec. 1, 2015

(54) SYSTEM FOR PROVIDING ARS INTERLOCKING DATA USING RING DATA AND METHOD THEREOF

(75) Inventors: Se-Yong Lee, Seoul (KR); Ki-Won Nam, Seoul (KR); Hyun-Jong Song, Seoul (KR); Kyo-Sik Hong, Anseong-si (KR)

(73) Assignee: Se-Yong Lee, Seoul (KR)

( * ) Notice: Subject to any disclaimer, the term of this patent is extended or adjusted under 35 U.S.C. 154(b) by 71 days.

(21) Appl. No.: 13/882,736

(22) PCT Filed: Feb. 1, 2012

(86) PCT No.: PCT/KR2012/000795
§ 371 (c)(1),
(2), (4) Date: Apr. 30, 2013

(87) PCT Pub. No.: WO2013/105686
PCT Pub. Date: Jul. 18, 2013

(65) Prior Publication Data
US 2014/0018054 A1    Jan. 16, 2014

(30) Foreign Application Priority Data
Jan. 12, 2012   (KR) .......................... 10-2012-0003828

(51) Int. Cl.
| | |
|---|---|
| *G06Q 10/10* | (2012.01) |
| *G06Q 30/00* | (2012.01) |
| *G06Q 30/02* | (2012.01) |
| *H04W 4/16* | (2009.01) |
| *H04W 4/00* | (2009.01) |

(52) U.S. Cl.
CPC ................. *H04W 4/16* (2013.01); *G06Q 10/10* (2013.01); *G06Q 30/01* (2013.01); *G06Q 30/02* (2013.01); *H04W 4/001* (2013.01)

(58) Field of Classification Search
CPC .............. H04M 3/51; H04M 3/42382; H04M 2201/38; H04M 3/42391; H04M 3/5183; H04M 2203/2011; H04M 2207/18; H04W 4/16; H04W 4/001; H04L 67/36; G06Q 10/10; G06Q 30/01; G06Q 30/02
USPC ............................................... 455/412.1, 418
See application file for complete search history.

(56) References Cited

U.S. PATENT DOCUMENTS

| | | | |
|---|---|---|---|
| 7,027,571 B1* | 4/2006 | Cook ......................... | 379/88.17 |
| 2004/0019476 A1* | 1/2004 | Glynn ............... | 704/1 |
| 2004/0242216 A1* | 12/2004 | Boutsikakis ................. | 455/418 |
| 2005/0207545 A1* | 9/2005 | Gao et al. ................... | 379/88.17 |
| 2010/0210245 A1* | 8/2010 | Kim ........................... | 455/412.1 |

* cited by examiner

*Primary Examiner* — Dinh P Nguyen
(74) *Attorney, Agent, or Firm* — Novick, Kim & Lee, PLLC; Jae Youn Kim

(57) ABSTRACT

Disclosed are a system for providing ARS interlocking data using ring data with drastically improved convenience and economic efficiency by allowing a user to transmit screen data packets output on a screen at a time in interlock with each number to be selected by his/her telephone when the user attempts a call connection to receive the ARS, and a method thereof. According to the present invention, the system for providing ARS interlocking data using ring data and a method thereof can rapidly select the desired items on the screen without the requirement of listening to all the ARS guide messages at the time of selecting specific items.

6 Claims, 6 Drawing Sheets

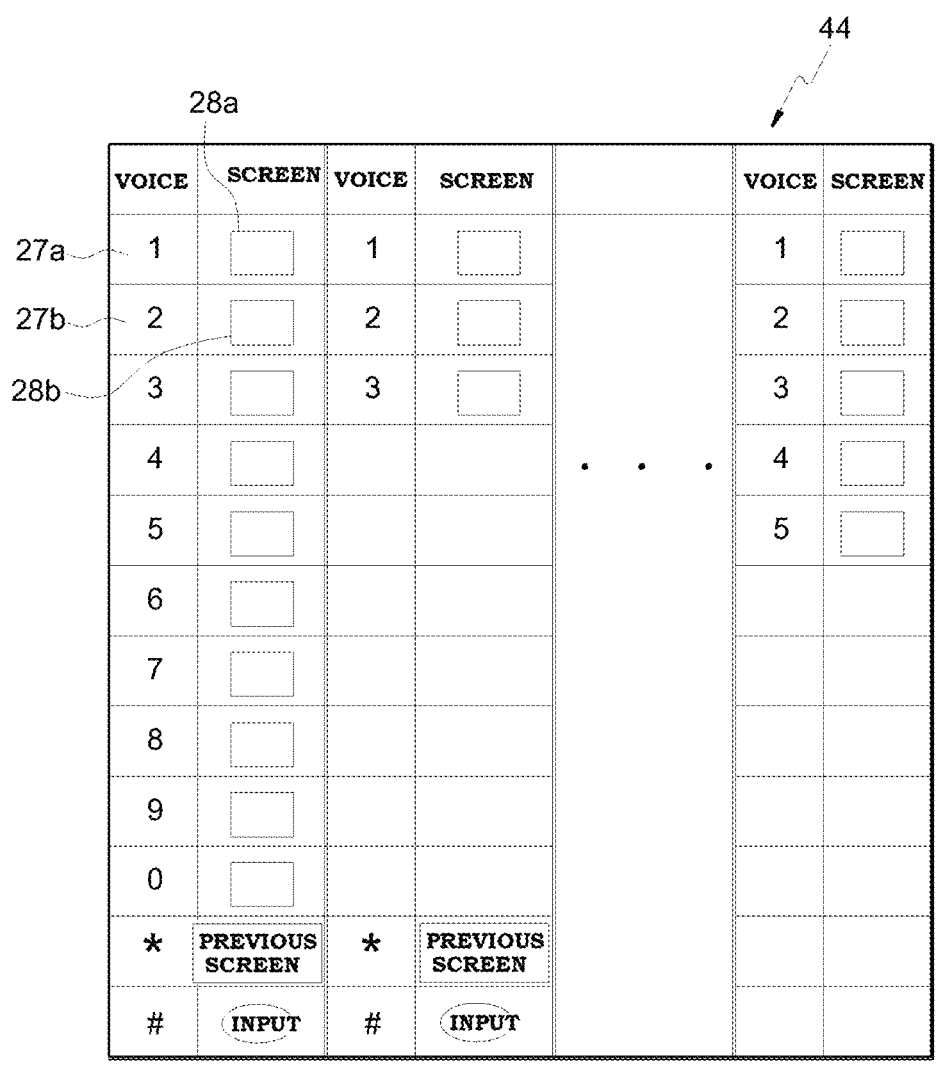

| | 28a | | | | | 44 |
|---|---|---|---|---|---|---|
| VOICE | SCREEN | VOICE | SCREEN | | VOICE | SCREEN |
| 27a — 1 | ☐ | 1 | ☐ | | 1 | ☐ |
| 27b — 2 | ☐ | 2 | ☐ | | 2 | ☐ |
| 28b — 3 | ☐ | 3 | ☐ | ... | 3 | ☐ |
| 4 | ☐ | | | | 4 | ☐ |
| 5 | ☐ | | | | 5 | ☐ |
| 6 | ☐ | | | | | |
| 7 | ☐ | | | | | |
| 8 | ☐ | | | | | |
| 9 | ☐ | | | | | |
| 0 | ☐ | | | | | |
| * | PREVIOUS SCREEN | * | PREVIOUS SCREEN | | | |
| # | INPUT | # | INPUT | | | |

FIG. 5

SYSTEM FOR PROVIDING ARS INTERLOCKING DATA USING RING DATA AND METHOD THEREOF

BACKGROUND OF THE INVENTION

1. Field of the Invention

The present invention relates to a system for providing automatic response service (ARS) interlocking data using ring data and a method thereof, and more particularly, to a system for providing ARS interlocking data using ring data with drastically improved convenience and economic efficiency by allowing a user to transmit screen data packets output on a screen at a time in interlock with each number to be selected by his/her telephone when the user attempts a call connection to receive the ARS and to compositely perform screen processing in interlock with the ARS, and a method thereof.

2. Description of the Related Art

As known, with the recent development of information communication technologies, the development of information providing technologies providing information on various fields to multiple subscribers in real time via at least one host server over a long distance data communication network has been actively pursued.

In connection with this, peripheral technologies such as a cache memory extension technology for more rapidly providing accurate information to a subscriber, information selection technologies more conveniently accessing a subscriber's taste and preference, and compression technologies are being developed recently and various contents and solutions thereof based on such technologies have been steadily developed.

With the advancement of industrialization, providing an answer to various customer queries and information thereon before the sale of products, during the delivery of products, and after the sale of products by the augmentation of service systems for the sale of products is also an important part of marketing, which greatly affects the sales of a selling company. However, as the number of counselors is increased, labor costs are increased.

In particular, companies such as financial companies require very many questions and answers, but these companies also may not employ many counselors on economic grounds. Recently, therefore, when a user selects a previously programmed path using an ARS, the corresponding answer is automatically extracted and output and membership information or card information is previously acquired by an ARS in advance even though the user finally contacts a counselor, such that counseling may be progressed more rapidly.

However, the ARS system may prevent a user from rapidly entering his/her desired items and the user may not determine what number the desired item number is until he/she hears voice requests and directions coming out of a receiver one at a time.

Further, when the ARS is provided to the deaf or the elderly with poor hearing ability or is provided to a place at which there is a lot of noise, a case in which the service is not smoothly progressed may frequently occur.

Therefore, a method of allowing a user to read a screen provided by a server and to receive an ARS in the state in which a user's telephone accesses a server over the wireless Internet may be considered.

In this case, all the ARS providers should have a system for providing an ARS to a screen over the wireless Internet, and therefore pay a great deal of costs. Further, since the user's telephone continues to access the server providing the ARS screen while the user receives the ARS over the screen, a traffic load on the server to provide the ARS screen service is not large, but line traffic for maintaining simultaneous access between a plurality of telephones and the server is very large, such that the server is highly likely to become down. In addition, in case of increasing capacity in order to stably maintain a server, economic costs are significantly increased.

SUMMARY OF THE INVENTION

Accordingly, it is an object of the present invention to provide a system for providing ARS interlocking data using ring data with drastically improved convenience and economic efficiency by allowing a user to transmit screen data packets output on a screen at a time in interlock with each number to be selected by his/her telephone when the user attempts a call connection to receive the ARS and to compositely perform screen processing in interlock with the ARS, and a method thereof.

According to an aspect of the present invention, there is provided a system for providing automatic response service (ARS) interlocking data using ring data, including: a user terminal accessing an ARS server to receive an automated voice response service and generate a key selection signal, and receiving and outputting ARS interlocking screen data packets from a ring data output management server; the ARS server programmed to provide the automated voice response service corresponding to the key selection signal generated from a user terminal and determining a call connection request of the user terminal to transmit the ARS interlocking screen data packet and identification information of the user terminal to the ring data output management server; and the ring data output management server receiving and registering the interlocking screen data packet from the ARS server and transmitting the ARS interlocking screen data packet to the corresponding user terminal.

Preferably, the user terminal extracts and outputs specific interlocking screen data interlocking with the key selection signal generated by a user.

Preferably, the screen data are each uniquely allocated with identification numbers so as to follow up and output the sequentially generated key selection signals.

Preferably, the screen data includes advertisement data.

Preferably, the interlocking screen data packet stored in the ring data output management server is matched with an ARS representative telephone number and stored.

Preferably, the user terminal includes: a communication module accessing a voice communication network and a data communication network to perform communication; an ARS ring data receiving unit receiving an ARS interlocking screen data; a key selection signal analysis unit analyzing a button key selection signal selected or input by the user; a matching screen extraction unit extracting screen data matched for each menu sequence and each key selection signal; a key selection signal generation unit generating the key selection signal by the selection or input of the user; a voice data receiving unit receiving voice data from the ARS server; a voice data output unit outputting voice data; a screen output unit outputting the ARS interlocking screen data; a data storage unit receiving and storing the ARS interlocking screen data and storing the identification codes for each screen data matched for each menu sequence and each key selection signal; and a controller performing a control to receive and store the ARS interlocking screen data received at the time of attempting a connection to a specific ARS connection number, to extract the screen data matched for each menu sequence and each key selection signal at the time of performing the ARS, and to output the extracted screen data on the screen.

Preferably, the system further includes a screen size control unit to control a size of the screen data according to the user selection.

Preferably, the system further includes an automatic deleting processing unit automatically deleting the received and stored ARS interlocking screen data packet at the time of releasing a connection to a specific ARS connection number.

According to another aspect of the present invention, there is provided a method for providing ARS interlocking data using ring data, including the steps of: receiving a call connection request signal from a specific user terminal by a specific ARS server; first transmitting ARS interlocking screen data to a ring data output management server by a corresponding ARS server; second transmitting the corresponding ARS interlocking screen data to a corresponding user terminal by the ring data output management server; call connecting the corresponding user terminal to the corresponding ARS server; extracting, by the user terminal, an initial screen of the corresponding ARS and outputting the extracted initial screen on a screen; determining, by the corresponding user terminal, whether the key selection signal of the user is generated; transmitting the corresponding key selection signal to the ARS server by the corresponding user terminal; extracting, by the corresponding user terminal, screen data interlocking with the corresponding key selection signal; and outputting the corresponding screen data by the corresponding user terminal.

Preferably, the method further includes the step of, before the step of receiving a call connection request signal, extracting the screen data interlocking with the key selection signal and outputting the extracted screen data on the screen and downloading and installing a ring data output application from the ring data output management server.

Preferably, the ARS interlocking screen data is annexed with an ARS identification number to confirm data.

Preferably, the step of first transmitting an ARS interlocking screen data further includes transmitting, by the corresponding ARS server, the identification number of the originating user terminal to the ring data output management server.

Preferably, the step of first transmitting ARS interlocking screen data further includes matching and storing, by the ring data output management server, the corresponding interlocking screen data with the ARS identification number.

Preferably, the step of extracting screen data further comprises analyzing a key selection signal.

Preferably, the method further includes the steps of, after the step of outputting the corresponding screen data, determining whether the user terminal receives an ending signal of the ARS or a call connection releasing signal; and ending an ARS interlocking screen data output service.

Preferably, the method further includes the step of, at the time of ending the ARS interlocking screen data output service, automatically deleting the corresponding interlocking screen data.

Preferably, the step of second transmitting the corresponding ARS interlocking screen data further includes inserting, by the ring data output management server, advertisement data into the interlocking screen data. According to the present invention, the system for providing ARS interlocking data using ring data and a method thereof can rapidly select the desired items on the screen without the requirement of listening to all the ARS guide messages at the time of selecting specific items. Further, the elderly, the deaf, and the like, with poor hearing ability may conveniently receive services by using an ARS screen composite mode. Further, since all the screen data interlocking with buttons selected by the user is transmitted to the user at the time of attempting a call connection, the server need not continuously access the user terminal during the progress of ARS, such that the traffic is not increased.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a diagram illustrating, in a table, sequential screen data for each number implemented by the system for providing ARS interlocking data using ring data according to the preferred embodiment of the present invention;

DETAILED DESCRIPTION OF THE INVENTION

Hereinafter, preferred embodiments of the present invention will be described in detail below with reference to the accompanying drawings.

Figure 1:
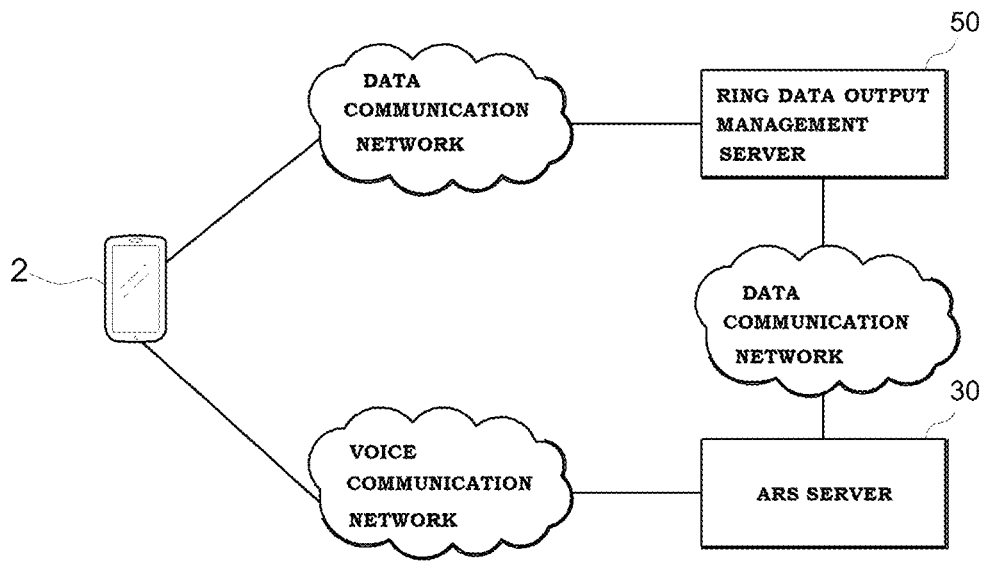
FIG. 1 is a diagram illustrating a schematic configuration of a system for providing ARS interlocking data using ring data according to a preferred embodiment of the present invention.
Figure 2:
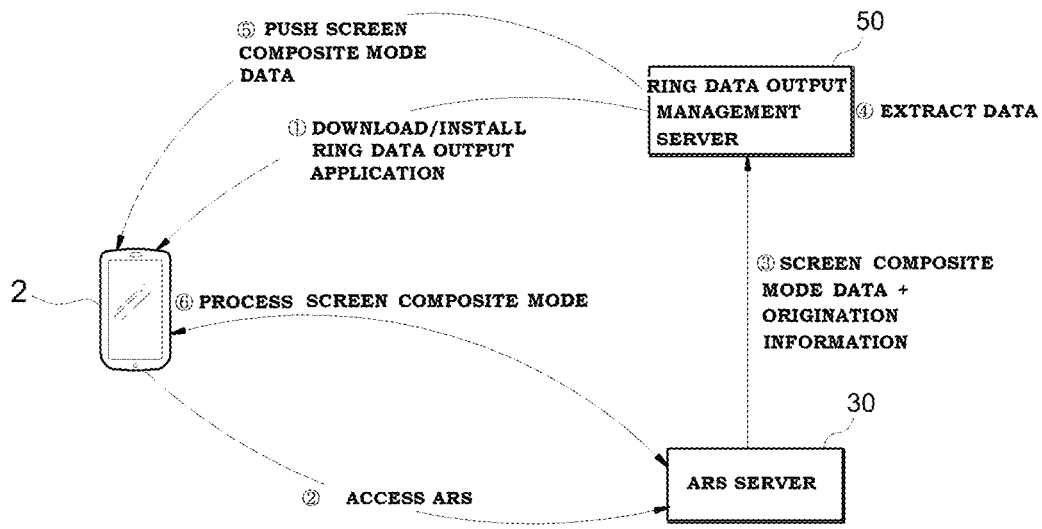
FIG. 2 is a diagram illustrating the data flow state of the system for providing ARS interlocking data using ring data according to the preferred embodiment of the present invention.

FIG. 1 is a diagram illustrating a schematic configuration of a system for providing ARS interlocking data using ring data according to a preferred embodiment of the present invention, and FIG. 2 is a diagram illustrating the data flow state of the system for providing ARS interlocking data using ring data according to the preferred embodiment of the present invention.

Referring to FIGS. 1 and 2, the system for providing ARS interlocking data using ring data according to the preferred embodiment of the present invention is a system with drastically improved convenience and economic efficiency by allowing a user to transmit screen data packets output on a screen at a time in interlock with each number to be selected by his/her telephone when the user attempts a call connection to receive an ARS and to compositely perform screen processing in interlock with the ARS.

That is, the system for providing ARS interlocking data using ring data according to the preferred embodiment of the present invention transmits screen data packets related to ARS screen data to the corresponding user terminal by the same method as ring data transmission when a user's call connection is attempted using a mobile terminal (hereinafter referred to as a "user terminal") so as to receive the ARS and outputs the screen data packets on the screen. Herein, the ring data is data (ring data, referred to as "signature information" in Korean Patent Registration No. 10-602734) obtained by allowing an originating user or a termination user to transmit data previously registered in a server to an opposing terminal when a caller attempts a call connection and output the transmitted data on the screen, by a configuration implemented in the above Korean Patent Registration No. 10-602734, entitled "a system for controlling remote wireless data using a mobile terminal and a method thereof," filed on Jan. 27, 2003 by the present applicant.

However, the ring data processed by the system for providing ARS interlocking data using ring data according to a preferred embodiment of the present invention is screen data output in interlock with the voice output of the ARS, and thus is data processed by the composite screen mode, which is below referred to as interlocking screen data, and each screen data is allocated with screen identification codes and is thus selectively output in interlock with a button number selected by the user.

Meanwhile, the preferred embodiment of the present invention is characterized in that the system for providing ARS interlocking data using ring data transmits a plurality of interlocking screen data output on a user's screen to a user terminal in a packet unit and does not have to maintain separate access from the server, thereby reducing traffic allocated to the server.

That is, the system for providing ARS interlocking data using ring data according to the preferred embodiment of the present invention is a system that supports the output of the interlocking screen data while progressing voice ARS as it is, and therefore does not have to maintain access with the server, configure the ARS server so as to implement wireless Internet, and perform hyperlink processing on items belonging to each screen so as to generate key selection signals.

In more detail, the system for providing ARS interlocking data using ring data according to the preferred embodiment of the present invention is configured to include a user terminal 2 that may access an ARS server 30 to receive an automated voice response service and generate the key selection signals and at the same time, receives screen data packets interlocking with the ARS (hereinafter referred to as "ARS interlocking screen data") from a ring data output management server 50 to output the screen data interlocking with the key selection signals selected and generated by the user at the time of the progress of the ARS.

Further, the system for providing ARS interlocking data using ring data according to the preferred embodiment of the present invention is configured to include an ARS server 30 that is programmed to provide the ARS corresponding to the key selection signal generated from the user terminal 2, determine the call connection request of the user terminal 2, and transmit the ARS interlocking screen data packet and the identification information of the user terminal 2 to the ring data output management server 50.

Meanwhile, the system for providing ARS interlocking data using ring data according to the preferred embodiment of the present invention is configured to include the ring data output management server 50 that receives and registers the ARS interlocking screen data packets from the ARS server 30 and transmits the ARS interlocking screen data packets to the corresponding user terminal 2.

That is, the system for providing ARS interlocking data using ring data according to the preferred embodiment of the present invention may output screen data interlocking with the automated voice response while listening to the automatically responded voice (which may be generated by allowing a user to select the required key selection signals only by the screen operation without actually requiring listening to the automated voice response) in the state in which the system accesses the ARS server 30 through the user terminal 2.

In addition, the ARS interlocking screen data output to the user terminal 2 is output in interlock with the automated voice response, but the user terminal is not accessed the ARS server 30 or the ring data output management server 50 in real time, such that the traffic for line maintenance is not increased.

Further, the ARS interlocking screen data output to the user terminal 2 so as to achieve the same effect as the case in which the user terminal 2 accesses the ARS server 30 or the ring data output management server 50 in real time are output in interlock with the automated voice response. For this purpose, each screen data is allocated with unique identification codes so that the ARS interlocking screen data output to the user terminal 2 may be output in interlock with the automated voice response or the key selection signals selected by the user.

The ARS server 30 requests the ARS interlocking screen data interlocking with the automated voice response to the ring data output management server 50 before the completion of the call connection at the time of requesting the call connection to the specific ARS server 30 through the user terminal 2 and the ring data output management server 50 may transmit the screen data of the corresponding ARS provider to the corresponding user terminal 2 by transmitting identification information of the originating terminal, that is, the user terminal 2, for example, a number of the user terminal 2 when the ARS server 30 requests the transmission of the ARS interlocking screen data to the ring data output management server 50.

In this case, as described above, the user terminal 2 simultaneously receives the corresponding ARS interlocking screen data packets from the ring data output management server 50 at the time of generating the request signal for call connection to the specific ARS server 30, such that the user terminal 2 may extract and output the specific screen data sequentially allocated with the unique codes in advance along the path corresponding to the key selection signals selected by the user based on applications mounted therein.

That is, the user terminal 2 performs a control to extract and output the specific interlocking screen data interlocking with the key selection signals generated by the user.

Further, each screen data may be uniquely allocated with identification codes so as to follow up and output the sequentially generated key selection signals.

In addition, the ARS interlocking screen data may include advertisement data and the user may receive services only by reading the advertisement data inserted into the ARS interlocking screen data without paying separate costs, while receiving the additional service known as the ARS interlocking screen.

Further, the ring data output management server 50 included in the system for providing ARS interlocking data using ring data according to the preferred embodiment of the present invention may receive the ARS interlocking screen data packets from the ARS server 30 in real time and can transmit the ARS interlocking screen data packets to the corresponding user terminal 2 when the call connection request to the ARS server 30 of the user terminal 2 is confirmed in the state in which the ARS interlocking screen data packets are stored and registered in advance.

To this end, the ARS interlocking screen data packets are preferably matched with an ARS representative telephone number and stored in the ring data output management server 50.

Therefore, according to the system for providing ARS interlocking data using ring data according to the preferred embodiment of the present invention, when the user accesses the ring data output management server 50 using the user terminal 2 to request a download to the ring data output applications, the ring data output management server 50 extracts the ring data output applications and downloads the extracted applications to the corresponding user terminal 2.

In this state, when the user inputs the specific ARS telephone number to transmit the call connection request signal to the corresponding ARS server 30, the corresponding ARS server 30 transmits the ARS interlocking screen data to the ring data output management server 50.

The ring data output management server 50 receives the corresponding ARS interlocking screen data packets and transmits the corresponding ARS interlocking screen data packets to the user terminal 2 based on the terminal identification number of the originating user.

When the corresponding ARS interlocking screen data packets are transmitted to the corresponding user terminal 2, the corresponding user terminal 2 is in a state of call connection with the corresponding ARS server 30.

When the corresponding user terminal 2 is in a state of call connection with the corresponding ARS server 30, the user terminal 2 extracts initial screen data of the corresponding ARS among the ARS interlocking screen data packets and outputs the extracted initial screen data on the screen. The operation can be performed since the initial screen data of the ARS is designated in advance as initial output data.

Next, information is inserted into the initial screen data of the ARS so that for any one of a plurality of menu items to be selected as an input of an alphanumeric button, the automated voice response data provided from the ARS server 30 is output through a speaker.

In this state, when the user selects any one of the plurality of menu items as the input of the alphanumeric button through the user terminal 2, the user terminal 2 analyzes the key selection signals for the corresponding alphanumeric button to determine which button is selected and extracts the screen data interlocking with the corresponding key selection signals and outputs the extracted screen data on the screen.

At the same time, the key selection signals are transmitted to the corresponding ARS server 30.

That is, since the screen data output at the time of selecting No. 1 key selection signal and the screen data output at the time of selecting No. 2 key selection signal are different from each other, unique identification codes are allocated to each of the screen data in advance, such that both of the screen data are extracted in interlock with the key selection signals.

Further, the screen data is matched corresponding to the key selection signals in sequence.

Figure 3:
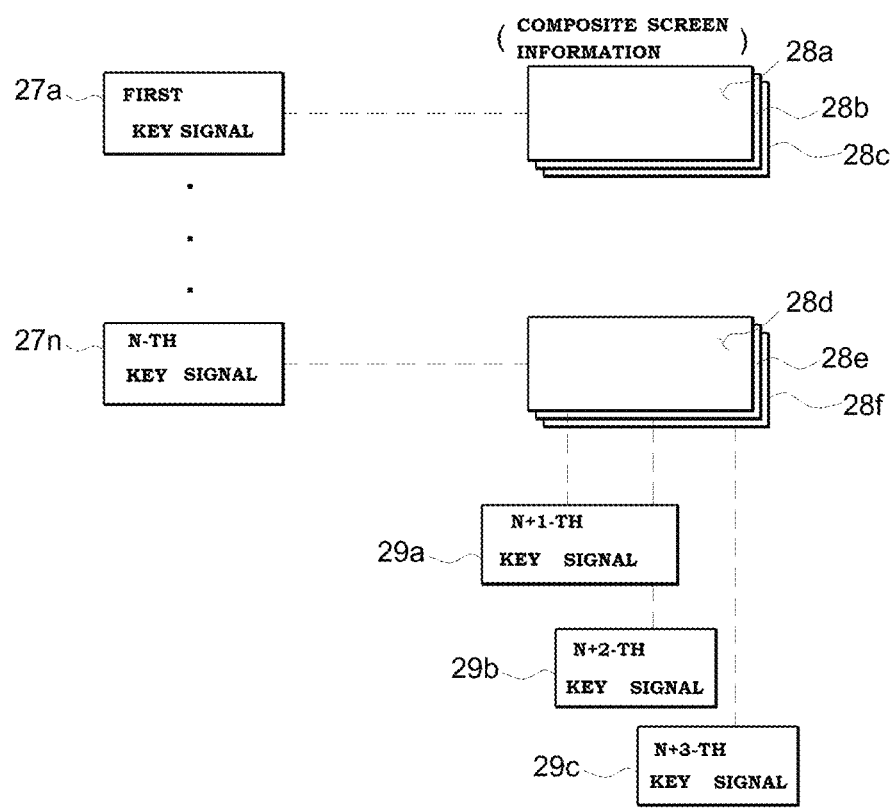
FIG. 3 is a diagram illustrating the selection button interlocking state of screen data implemented by the system for providing ARS interlocking data using ring data according to the preferred embodiment of the present invention.
Figure 4:
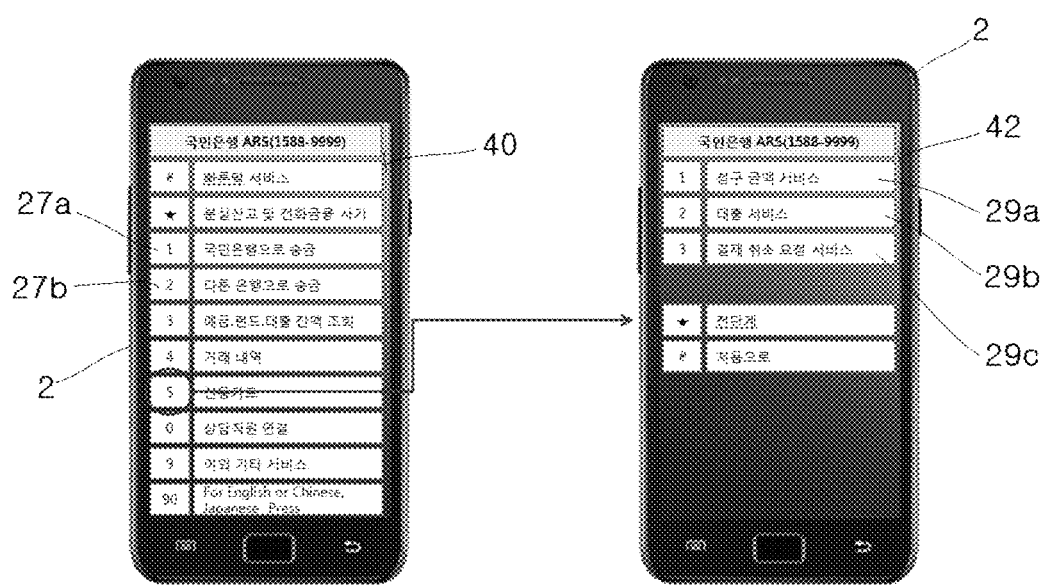
FIG. 4 is an exemplary view of a screen illustrating an output state of a screen composite mode implemented by the system for providing ARS interlocking data using ring data according to the preferred embodiment of the present invention.

FIG. 3 is a diagram illustrating the selection button interlocking state of screen data implemented by the system for providing ARS interlocking data using ring data according to the preferred embodiment of the present invention, FIG. 4 is an exemplary view of a screen illustrating an output state of a screen composite mode implemented by the system for providing ARS interlocking data using ring data according to the preferred embodiment of the present invention, and FIG. 5 is a diagram illustrating, in a table, sequential screen data for each number implemented by the system for providing ARS interlocking data using ring data according to the preferred embodiment of the present invention.

Referring to FIGS. 3 to 5, the user terminal 2 receiving the ARS interlocking screen data packets from the ring data output management server 50 included in the system for providing ARS interlocking data using ring data according to the preferred embodiment of the present invention may access the ARS server 30 to appropriately output the ARS interlocking screen data in interlock with the received automated voice response service.

For example, the user terminal 2 receiving the ARS interlocking screen data packets from the ring data output management server 50 extracts the screen data 40 allocated with the initial screen code designated by the corresponding ARS server 30 and outputs the extracted screen data on the screen as illustrated in the left of FIG. 4.

In this state, when the user generates any of first key selection signal 27*a* to N-th key selection signal 27*n* through a key input unit (not illustrated) of the user terminal 2, the ARS interlocking screen data 28*a*, 28*b*, and 28*c* of any identification code matching each key selection signal 27*a* to 27*n* are extracted and output on the screen. Further, screen data 28*d*, 28*e*, and 28*f* corresponding to a N+1-th, N+2-th, and N+3-th tone signals 29*a*, 29*b*, and 29*c* are matched and stored in the ring data output management server so as to extract and output on the screen.

For example, when the user generates a fifth key selection signal 27*e* through the key input unit of the user terminal 2, the screen data 42 interlocking with the fifth key selection signal 27*e* is output as illustrated in the right of FIG. 4.

Information related to a credit card is inserted into the screen data 42 and similarly, the key selection signal may be generated by inputting buttons such as 1, 2, 3, *, and # inserted into the corresponding screen data 42.

In this case, the user does not directly operate buttons, such as 1, 2, 3, *, and # on the corresponding screen data 42, but according to the present invention, may operate button keys to generate key selection signals, such as 1, 2, 3, *, and # to carry out the automatic response service (ARS).

That is, the ARS interlocking screen data output in interlock with the key selection signals in sequence interlock with the ARS even though the user terminal 2 does not access the ARS server 30 in real time.

To this end, the ARS interlocking screen data packets sent from the ring data output management server 50 to the user terminal 2 are configured as a table as illustrated in FIG. 5 and the table 44 is previously designated with different screen data corresponding to the sequence and the selected key selection signals.

Figure 6:
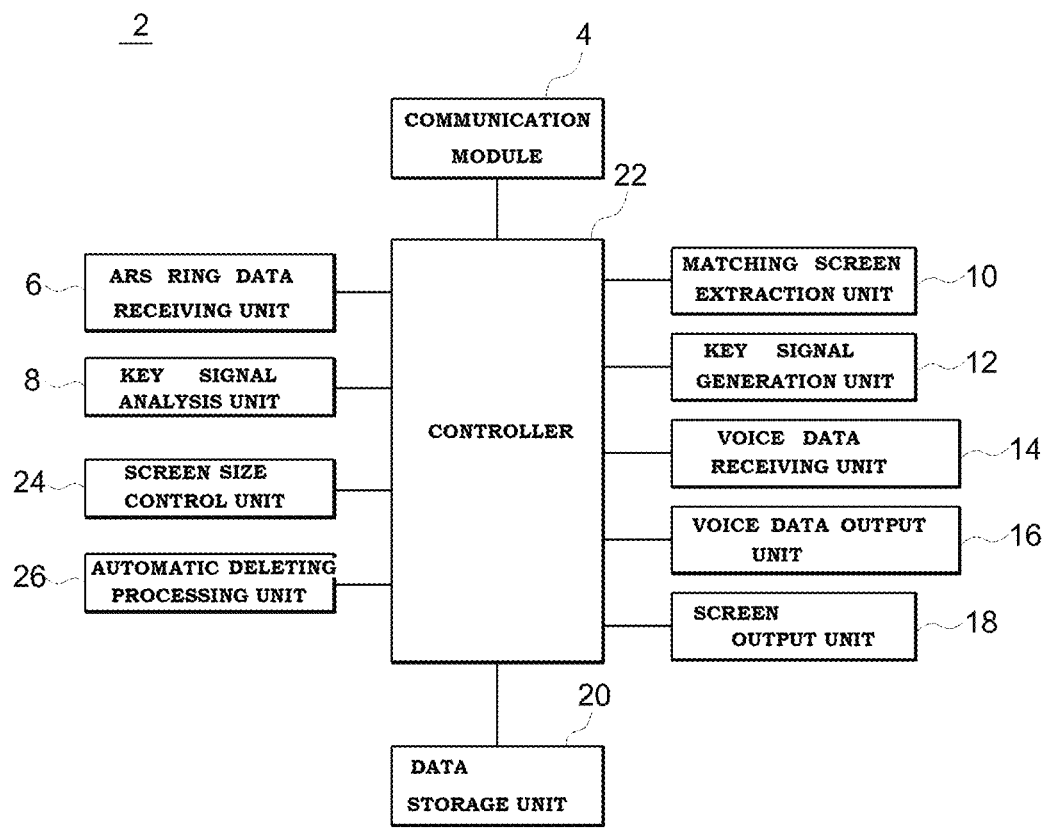
FIG. 6 is a block diagram illustrating a configuration of a user terminal included in the system for providing ARS interlocking data using ring data according to the preferred embodiment of the present invention.

FIG. 6 is a block diagram illustrating a configuration of a user terminal included in the system for providing ARS interlocking data using ring data according to the preferred embodiment of the present invention.

Referring to FIG. 6, the user terminal 2 included in the system for providing ARS interlocking data using ring data according to the preferred embodiment of the present invention is configured to include a communication module, an ARS ring data receiving unit, a key selection signal analysis unit, a screen size control unit, an automatic deleting processing unit, a matching screen extraction unit, a key selection signal generation unit, a voice data receiving unit, a voice data output unit, a screen output unit, a data storage unit, and a controller.

The communication module 4 accesses a voice communication network or a data communication network to perform communication, and the ring data receiving unit 6 for ARS receives the ARS interlocking screen data to receive and manage the ARS interlocking screen data transmitted from the ring data output management server 50.

The key selection signal analysis unit 8 analyzes the button key selection signals selected or input by the user to determine which button is input.

The matching screen extraction unit 10 extracts the screen data matched for each menu sequence and each key selection signal and extracts the specific screen data corresponding to each sequence and each key selection signal as written in the table since the identification codes extracted for each sequence and each key selection signal for the ARS interlocking screen data received from the ring data output management server 50 are written in the table.

The key selection signal generation unit 12 has a conventional configuration generating key selection signals selected and input by the user, the voice data receiving unit 14 has a conventional configuration receiving voice data from the ARS server 30, and the voice data output unit 16 has a conventional configuration such as a speaker outputting the voice data.

Further, the screen output unit 18 also has a conventional configuration such as a monitor outputting the ARS interlocking screen data.

Meanwhile, the data storage unit 20 receives and stores the ARS interlocking screen data and stores the identification codes for each screen data matching each menu sequence and each key selection signal.

The controller 22 performs a control to receive and store the ARS interlocking screen data received at the time of attempting a connection to the specific ARS connection number, to extract the screen data matched for each menu sequence and each key selection signal at the time of performing the ARS, and to output the extracted screen data on the screen.

Meanwhile, the user terminal 2 included in the system for providing ARS interlocking data using ring data according to the preferred embodiment of the present invention further includes a screen size control unit 24 so as to control the size of the screen data according to the user selection. When the size of the ARS interlocking screen data is largely expanded by the screen size control unit 24, people having weak sight and hearing such as the elderly may operate keys while conveniently viewing the screen.

Meanwhile, when the user terminal 2 receives all the automatic response services, there is no need to store the downloaded ARS interlocking screen data therein, and thus the user terminal preferably further includes an automatic deleting processing unit 26 automatically deleting the received and stored interlocking screen data packets at the time of releasing the connection to the specific ARS connection number.

The function and operation of the system for providing ARS interlocking data using ring data according to the preferred embodiment of the present invention configured as described above will be described in detail with reference to the accompanying drawings.

Figure 7:
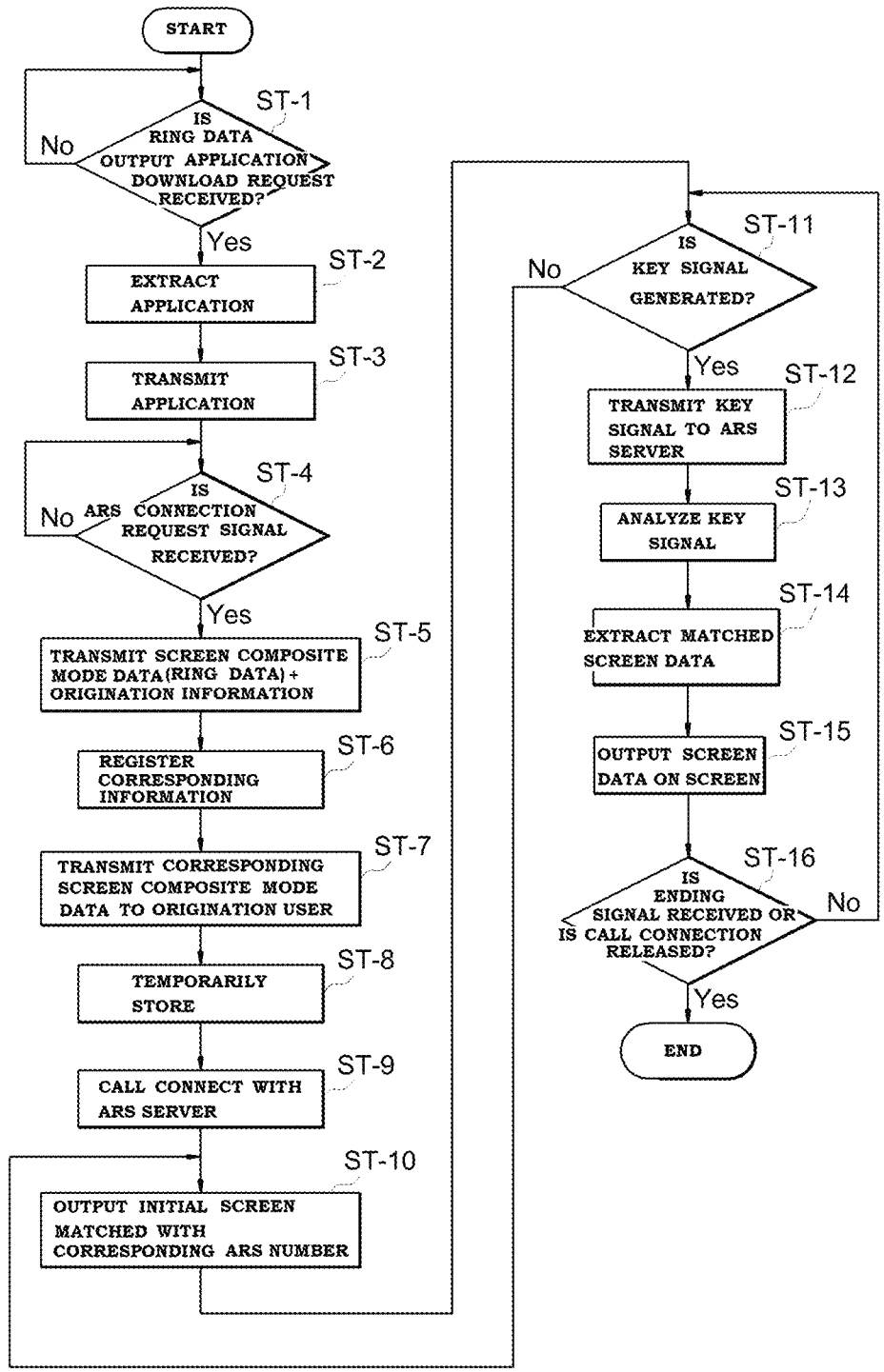
FIG. 7 is a flow chart illustrating a signal flow of the system for providing ARS interlocking data using ring data according to the preferred embodiment of the present invention.

FIG. 7 is a flow chart illustrating a signal flow of the system for providing ARS interlocking data using ring data according to the preferred embodiment of the present invention.

First, the system for providing ARS interlocking data using ring data according to the preferred embodiment of the present invention appropriately outputs the previously downloaded screen data on the screen in interlock with the progress state of ARS while receiving the ARS, thereby improving the user convenience.

Therefore, since applications for automatically outputting the foregoing ARS interlocking screen data corresponding to the sequentially selected key selection signals are installed in the user terminal 2, the user accesses the ring data output management server 50 using the user terminal 2.

When the download request signal for the ring data output applications is received from the specific user terminal 2 accessing the ring data output management server 50, the ring data output management server 50 extracts the ring data output applications and downloads the extracted applications to the corresponding user terminal 2.

Next, the corresponding user terminal 2 installs the downloaded ring data output applications.

In this state, when the user inputs the specific ARS telephone number (for example, 1599-1599) to transmit the call connection request signal to the corresponding ARS server 30, the corresponding ARS server 30 transmits the ARS interlocking screen data to the ring data output management server 50.

In this case, the corresponding ARS server 30 transmits the terminal number of the originating user to the ring data output management server 50, along with the ARS interlocking screen data.

Meanwhile, the ring data output management server 50 receives the corresponding ARS interlocking screen data packets and transmits the corresponding ARS interlocking screen data packets to the user terminal 2 through the terminal identification number of the originating user.

In this case, the ring data output management server 50 may receive the corresponding ARS interlocking screen data packet from the ARS server 30 in real time, but may also receive and register the corresponding ARS interlocking screen data packets in advance even though there is no call connection request from the user terminal 2. If the corresponding ARS interlocking screen data packets are received and registered in advance in the ring data output management server, when the call connection request is generated from the user terminal 2, the ring data output management server 50 is enough to receive only the identification number (for example, telephone number) of the corresponding user terminal 2 from the ARS server 30.

Meanwhile, since the ring data output management server 50 may insert the advertisement data into the interlocking screen data, the ring data output management server 50 may prepare the final interlocking screen data to be transmitted to the user terminal 2 through the advertisement data insertion process.

When the transmission of the corresponding ARS interlocking screen data packets to the corresponding user terminal 2 is completed, since the corresponding user terminal 2 is in a call connection with the corresponding ARS server 30, the transmission of the ARS interlocking screen data packets are rapidly performed by a recent push method, and thus the transmission of the ARS interlocking screen data packets is performed for a standby time for call connection. Since the user receives the ARS interlocking screen data packets for a general standby time for call connection, the call connection standby time is not delayed and the call connection and the data transmission are performed nearly simultaneously.

When the corresponding user terminal 2 is in a call connection with the corresponding ARS server 30, the user terminal 2 extracts an initial screen data of the corresponding ARS among the ARS interlocking screen data packets and outputs the extracted initial screen data on the screen. The operation can be made since the initial screen data of the ARS is designated as the first output data.

Next, information is inserted into the initial screen data of the ARS so that any one of a plurality of menu items can be selected as an input of an alphanumeric button, such that the automated voice response data provided from the ARS server 30 are output.

In this state, when the user selects any one of the plurality of menu items as the input of the alphanumeric button through the user terminal 2, the user terminal 2 analyzes the key selection signals for the corresponding alphanumeric button to determine which button is selected and extracts the screen data interlocking with the corresponding key selection signals and outputs the extracted screen data on the screen.

At the same time, the key selection signals are transmitted to the corresponding ARS server 30.

That is, since the screen data output at the time of selecting a No. 1 key selection signal and the screen data output at the time of selecting a No. 2 key selection signal are different from each other, the unique identification codes are allocated to each of the screen data in advance, such that both of the screen data are extracted in interlock with the key selection signals.

Further, the screen data are matched corresponding to the key selection signals in sequence.

That is, when a No. 1 key selection signal is selected at the time of first selection and when the No. 1 key selection signal is selected at the time of second selection, different screen data are extracted, which may be written as table data in advance.

Therefore, the ARS interlocking screen data may be annexed with the ARS identification number to confirm data.

Next, the user terminal 2 determines whether the ending signal of the ARS or the call connection releasing signal are received and if it is determined that the ending signal or the call connection releasing signal of the corresponding ARS is received, the user terminal 2 ends the ARS interlocking screen data output service.

On the other hand, when the user terminal 2 has menu items to be selected without receiving the ending signal or the call connection releasing signal of the ARS, the generation of the key selection signals for menu selection and the output of the matched screen data are repeated.

Meanwhile, when the ARS interlocking screen data output service ends, allowing the user terminal 2 to automatically delete the corresponding interlocking screen data is preferable to manage a memory.

While the system for providing ARS interlocking data using ring data and method thereof has been described with reference to the preferred embodiment of the present invention, it will be understood by those skilled in the related art that various modifications and variations may be made therein without departing from the scope of the present invention as defined by the appended claims.

DESCRIPTION OF REFERENCE NUMERALS

2: user terminal, 30: ARS serve, 50: ring data output management server

What is claimed is:
1. A system for providing automatic response service (ARS) interlocking data using ring data, the system comprising:
a user terminal accessing an ARS server to receive an automated voice response service and generate a key selection signal, and receiving and outputting an ARS interlocking screen data packet from a ring data output management server at the same time;
the ARS server configured to:
provide the automated voice response in reply to the key selection signal generated from the user terminal, determine whether a call connection request of the user terminal is received, and
transmit the ARS interlocking screen data packet and identification information of
the user terminal to the ring data output management server; and
the ring data output management server receiving and registering the ARS interlocking screen data packet from the ARS server, and transmitting the ARS interlocking screen data packet to the user terminal,
wherein the ARS interlocking screen data packet has a plurality of screen data items,
wherein the user terminal is configured to extract a first screen data item from the plurality of screen data items and display the first screen data item,
wherein the first screen data item is extracted in reply to the key selection signal input by a user of the user terminal,
wherein the user terminal is configured to interlock the ARS interlocking screen data packet with the key selection signal, and
wherein the user terminal comprises:
a communication module accessing a voice communication network and a data communication network to perform communication;
an ARS ring data receiving unit receiving the ARS interlocking screen data packet;
a key selection signal analysis unit analyzing a button key selection signal selected or input by the user;
a matching screen extraction unit extracting the first screen data item matched with each of menu sequences and each of key selection signals made by the user;
a key selection signal generation unit generating the key selection signal by the selection or input of the user;
a voice data receiving unit receiving voice data from the ARS server;
a voice data output unit outputting voice data;
a screen output unit outputting the first screen data item for the ARS interlocking;
a data storage unit receiving and storing the ARS interlocking screen data packet, wherein each of the plurality of the screen data items of the ARS interlocking screen data packet has a respective identification code in reply to each of the screen data items matched with each of the menu sequences and each of the key selection signals; and
a controller performing a control to receive and store the ARS interlocking screen data packet at the time of attempting a connection to a first ARS connection number, wherein the controller is configured to extract the first screen data item matched with each of the menu sequences and each of the key selection signals at the time of performing the ARS, and to display the first screen data item on the screen.

2. The system of claim 1, wherein each of the plurality of the screen data items has an identification number, and wherein the user terminal is configured to display each of the screen data items in accordance with respective key selection signals input by the user.

3. The system of claim 1, wherein each of the screen data items includes advertisement data.

4. The system of claim 1, wherein the ARS interlocking screen data packet is stored in the ring data output management server with a corresponding ARS connection number.

5. The system of claim 1, further comprising a screen size control unit to control a display size of the screen data according to the user's selection.

6. The system of claim 1, further comprising an automatic deleting processing unit automatically deleting the received and stored ARS interlocking screen data packet when disconnected to the first ARS connection number.

* * * * *